United States Patent
Flaviani

[15] 3,651,647
[45] Mar. 28, 1972

[54] OIL SLICK CONFINEMENT EQUIPMENT

[72] Inventor: Edmond Flaviani, 719 28th Avenue, San Francisco, Calif. 94121

[22] Filed: Sept. 17, 1970

[21] Appl. No.: 73,001

[52] U.S. Cl. ........................................................61/1 F
[51] Int. Cl. .....................................................E02b 15/04
[58] Field of Search ................61/1 F, 5; 210/242, DIG. 21

[56] References Cited

UNITED STATES PATENTS 2,682,151  6/1954  Simpson et al. ...........................61/1 F
3,499,290  3/1970  Smith .......................................61/1 F

FOREIGN PATENTS OR APPLICATIONS 1,305,469  8/1962  France ......................................61/1 F Primary Examiner—Peter M. Caun
Attorney—Arlington C. White

[57] ABSTRACT

The disclosure relates to a device for confining pollution material floating on the surface of water to a given area for subsequent collection, storage or other disposition thereof. The device comprises a variable group of individual watertight floatable barrels rising above the water and affording a barrier against the escape of the pollution material from the area, together with universal joints connecting adjacent barrels of the group to one another and serving to allow the individual barrels to pitch and roll in accordance with the pitch and roll of the water upon which the barrels are floated and thus to maintain the barrier operative despite undue water movement.

5 Claims, 11 Drawing Figures

PATENTED MAR 28 1972 3,651,647

INVENTOR
EDMOND FLAVIANI
BY Arlington L. White
ATTORNEY

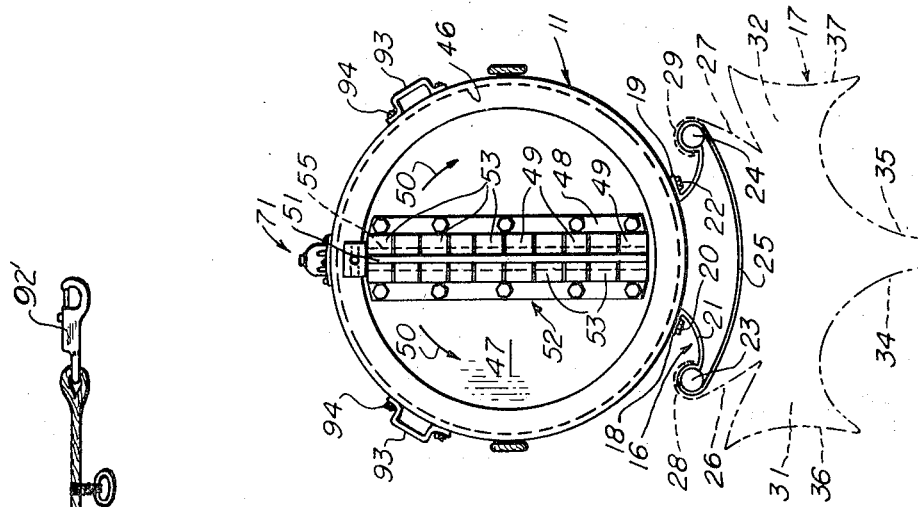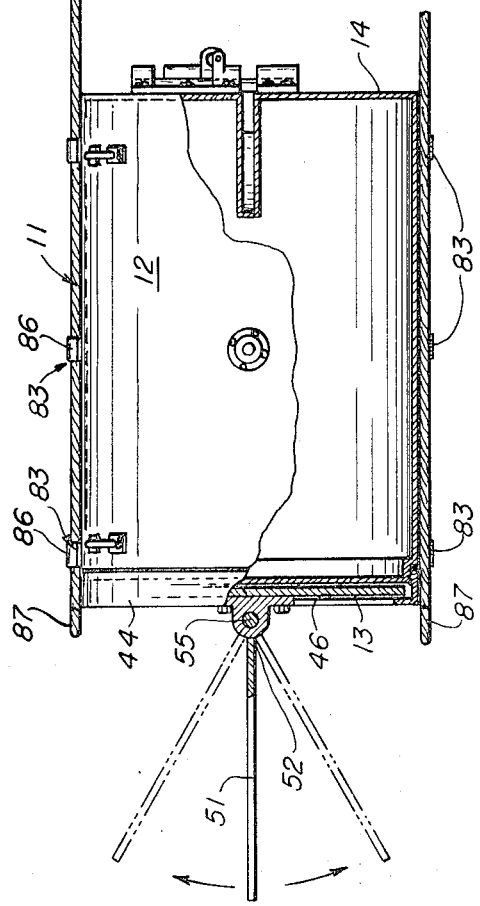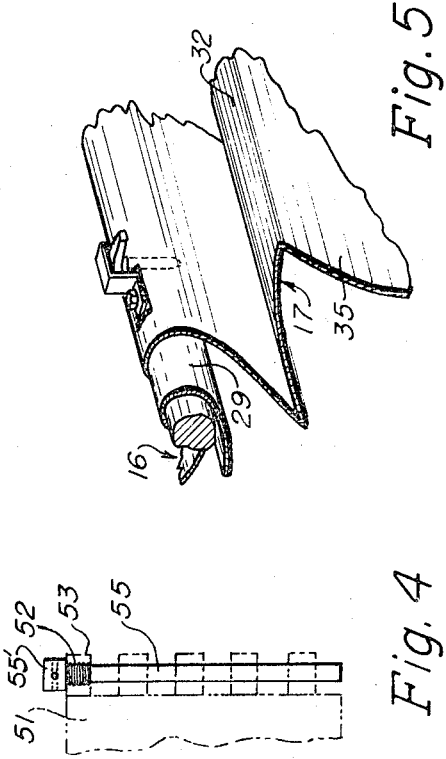

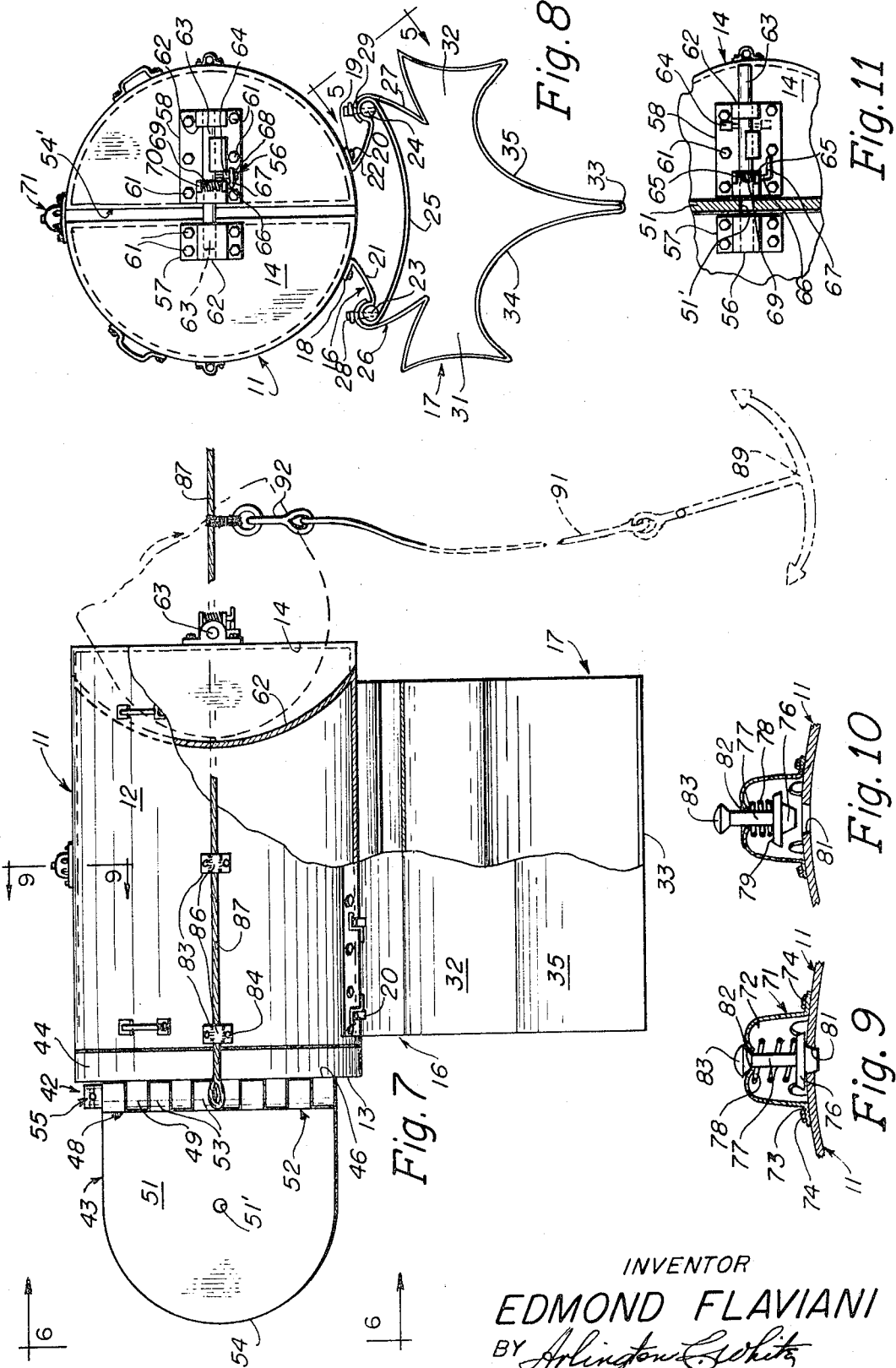

OIL SLICK CONFINEMENT EQUIPMENT

Heretofore in the art there have been developed a variety of different devices or equipment for meeting problems arising from pollution material, such as oil and the like that floats on the surface of water either in rivers, lakes or the open sea. Some of these devices are the subject of patents, such as the apparatus shown in the Dahan U.S. Pat. No. 3,476,246; the boom structure disclosed and claimed in U.S. Pat. Nos. 3,499,290 and 3,499,291; the inflatable float boom of U.S. Pat. No. 3,494,132; the barrier for oil spilt on water illustrated in U.S. Pat. No. 3,503,512; the device for collecting flotsam, especially waste oil spillage on a water surface, which is illustrated in FIG. 4 of U.S. Pat. No. 3,219,190, and others. While some of the apparatus disclosed and claimed in many of these prior patents are workable to some degree, the devices of the prior art patents largely are ineffective to barricade a section of the open sea where the water surface is always in motion. The present invention is directed to the provision of pollution confining means which is capable of following the varying movement of water, such as the pitch and roll of the sea and of making the barrier means operative and effective throughout the variable water movement.

A primary objective of my invention is to provide long lasting pollution confining equipment which rides the surface of polluted waters and retains surface pollutants to a predetermined area for subsequent removal.

Another important object of the present invention is to provide equipment of the indicated nature which is especially adaptable to the confinement of oil slick on the surface of sea water and which is characterized by its capability of maintaining a barrier in choppy waters.

A still further object of the invention is to provide equipment of the aforesaid nature which is additionally characterized by the inclusion of components for precluding danger or hazard from oil fires.

Another primary object of the invention is to provide equipment of the aforementioned character which is relatively inexpensive to manufacture and to maintain, and which can be placed in operative position as well as in inoperative position with facility.

Other objects of the invention, together with some of the advantageous features thereof, will appear from the following description of a preferred embodiment of the invention, which is illustrated in the accompanying drawings, and the best mode and manner of constructing the same. It is to be understood that I am not to be restricted to the precise embodiment shown nor to the precise components illustrated or the precise arrangement thereof, as the scope of the invention permits of a plurality and variety of different forms of the equipment.

Referring to the drawings:

FIG. 3 is a broken plan view, partly in section, of one of the units of the preferred embodiment prior to connecting the same to an adjacent unit.

FIG. 4 is an enlarged fragmentary detail showing in elevation certain components of the universal joints between adjacent units.

FIG. 5 is a fragmentary perspective view, partly in section, of one component of the keel attaching fin, utilized in the preferred embodiment of the invention; this view being taken on the line 5—5 of FIG. 8.

FIG. 6 is an elevational end view, partly in section of one unit including a component of universal joint between adjacent units of FIG. 8, the preferred embodiment of the invention; this view illustrating in dotted line showing of a stabilizing keel attached to the bottoms of the units.

FIG. 7 is a side elevational view, partly in section, of the unit illustrated in FIG. 6; this view being broken away to show the construction.

FIG. 8 is a view similar to FIG. 6 but taken from the opposite end of the unit and showing one component of the universal joint for receiving a complementary component of the joint carried by an adjacent unit.

FIG. 9 is a sectional elevational view of the pressure-release valve on each unit; this view being taken on the line 9—9 of FIG. 7 and showing the valve in closed position.

FIG. 10 is a view similar to FIG. 9 but showing the relief valve in open position.

FIG. 11 is an enlarged fragmentary detail of a universal joint component.

Figure 1:
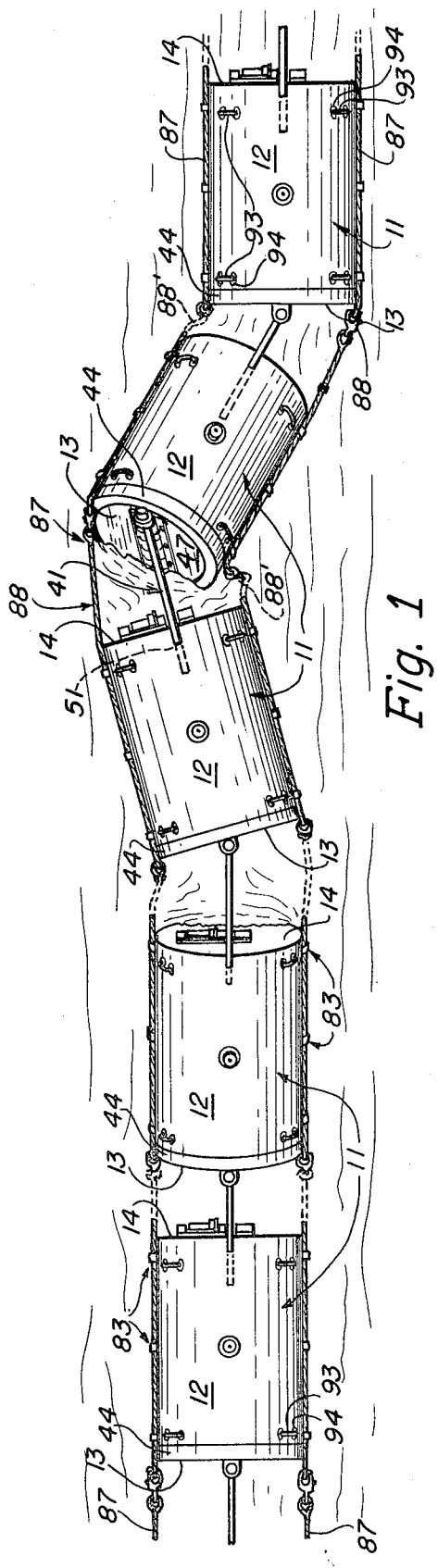
FIG. 1 is a plan view of a preferred embodiment of the invention.

In its preferred form, the present invention in oil slick confinement equipment preferably comprises a plurality of empty, floatable watertight drums, a universal joint connecting adjacently disposed drums of said plurality of drums, together with a cable lashed to all of said drums to lend resistance against displacement of the drums from stable upright operative positions in both calm and rough waters, and to facilitate withdrawal of the drums from a given area.

In accordance with my invention, I provide an indeterminate number of metal drums which are generally designated by the reference numeral 11 in the accompanying drawings and which conveniently are fabricated of a lightweight metal such as aluminum or an aluminum-nickel alloy. The body portion 12 of each drum is in the form of a cylinder, or is of circular cross section, and the ends 13 and 14 thereof are specially constructed as hereinafter more specifically described but are, of course, sealed in positions at opposite ends of cylindrical body 12 to provide a watertight drum which is floatable on any liquid body such as a lake of water, rivers or on ocean waters. The plurality of drums 11 are articulated to afford a boom-like structure which can be formed endless by joining opposite end drums of the boom together. When floated upon ocean waters or on lakes or the like and articulated together as an endless structure, the entire series of drums provide an upright barrier capable of confining any section of water to a predetermined area, depending upon the size or length of the articulated drums as an entity. When so arranged, the barrier is capable of confining area of polluted waters quickly and effectively.

Figure 2:
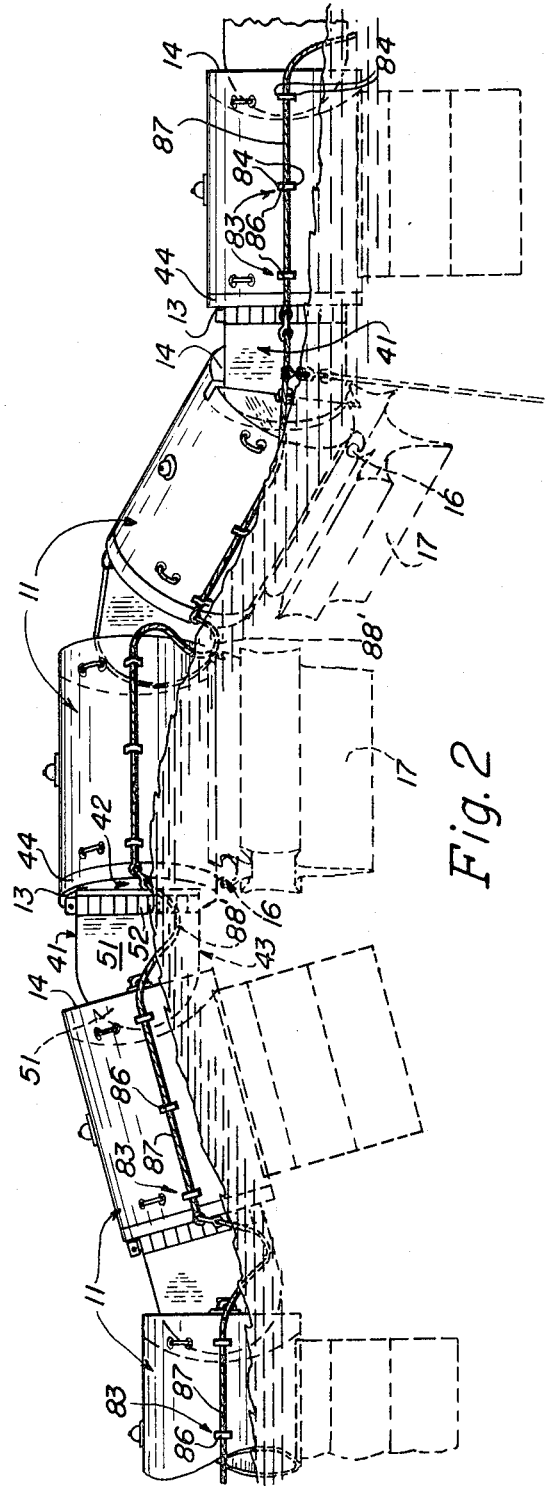
FIG. 2 is an elevational view of the embodiment of FIG. 1; this view illustrating the floatability and displacement of components in a choppy sea while maintaining an operative position.

As particularly illustrated in FIGS. 2, 6 and 8 of the annexed drawings, each of the watertight drums 11 is made to a length approximately one and one-half times its diameter and is floated on the water length-wise with approximately one-third of its diameter submerged.

In order to effect and to maintain floatable stabilization of the individual drums 11, I bolt or otherwise secure to the bottom of each drum an adapter 16 to which a specially constructed stabilizing fin and keel 17 is detachably secured. As shown in the annexed drawings, the adapters 16 extends approximately the full length of the bottom of the drums, and each adapter is provided with opposed arcuate tops 18 and 19 which conform to the curvature of the drum bottom. In the embodiment illustrated, bolts 20 are employed to securely fasten each adapter 16 to each drum bottom. The adapter 16 extends away laterally from the tops 18 and 19 by virtue of merging arms 21 and 22 which terminate in loops 23 and 24 which, in turn, merge with a curved or arcuate base 25. Associated with each adapter 16 is a combined stabilizing fin and keel 17 which is conveniently fabricated of a spring metal to permit of the bringing together and springing apart of opposed loop-gripping sections 26 and 27 which have inturned flanges 28 and 29 that removably engage and slidably fit over the loops 23 and 24, respectively, of the adapter 16, see FIGS. 5 and 6. Each of the combined stabilizing fin and keel 17 is shaped symmetrically to provide a pair of opposed laterally extending ears 31 and 32 of the same dimensions which merge with upper sections 26 and 27 as well as with a longitudinally extending straight keel 33 by means of arcuate sections 34 and 35 extending between ears 31, 32 and the keel.

It is observed that all of the surfaces, such as the outer surfaces 36 and 37 of the open ended fin body 17, are generally concave in contour in order to minimize abrupt or opposed edges or surfaces which are engaged by the water through which the drums 11 are moved or upon which waters the series of articulated drums ride in operative position, thus avoiding an overall pendulum movement which the waters tend to impart to the drums and affording smooth movement of these connected drums whether on calm waters or heavy seas and assisting in maintaining the drums upright.

In accordance with my present invention, I provide for universal movement of each drum 11 while articulated by employing specially constructed universal joints between adjacent connected drums. As a best mode of construction or manner of making each universal joint, which is generally designated by the reference numeral 41 in the views of the annexed drawings, I rotatably mount one main part, designated generally by the reference numeral 42, of each universal joint 41 in one end 13 of each of the articulated watertight, fireproof drums 11, and secure thereto for rotation with as well as pivotal movement in relation to such main part 42 of such joint 41, a second main part which is designated generally by the reference numeral 43 and which extends outwardly and is connected to the opposite end 14 of each drum 11. As shown, each end 13 of each drum is fashioned with a concave surface 13' and I secure to the exterior of each drum adjacent to end 13 thereof a specially constructed rim 44 which is formed with an interior annular groove 46 facing into the concave surface 13' and which movably receives a disc 47 constituting one component of part 42 of each universal joint. The rim 44 is also formed with an inner flange which converges inwardly toward the back of the concave surface 13' and serves as a guide to facilitate the seating and retention of the disc 47 in groove 46. Integral with disc 47 is a hinge section 48 comprising a plurality of spaced apart eyelets 49; such hinge section being substantially of the same dimension as the diameter of disc 47 and projects outwardly therefrom as shown. As indicated by the small arrows 50 in FIG. 6 of the annexed drawings, the disc 47 is free to rotate within groove 46 in both clockwise and counterclockwise directions.

The complementary or second main part 43 of each universal joint 41 preferably comprises a relatively large plate or panel 51 having a hole 51' therethrough and carrying at one end thereof a hinge section 52 comprising a series of spaced apart eyelets 53 which, when parts 42 and 43 of joints 41 are connected together, mesh with the spaced apart eyelets 49 of hinge section 48 of disc 47 of joint part 42. Hinge section 52 of plate 51 may be formed integral therewith and such plate 51 is fashioned with an arcuate opposite end 54 for reception and ready movement in the concave surface or recess 14' formed in end 14 of each drum as the main part 43 moves in response to the movement of the main part 42 of the joints 41 during the tossing about of the floating drums 11, thus maintaining the articulation of the drums despite the heavy movement of the water on which the drums 11 are floated. The hinge sections 48 and 52 of the main parts 42 and 43, respectively, are secured together by means of a pintle pin 55 which can be driven through the aligned meshing eyelets 49 and 53 of such hinge sections 48 and 52, respectfully, to firmly hold these sections together or which can be threadedly secured in position by providing exterior threads on the pin for engaging interior threads, see FIG. 4, on an appropriate eyelet, such as to top eyelet of the series of eyelets 49. To facilitate the turning down of such threaded pin to locked position in eyelets 49 and 53, the head 55' of pintle pin 55 can be provided with an integral depending flange having a series of holes therein for receiving a turning tool, not shown, for tightening or loosening the threaded pintle pin.

As particularly illustrated in FIGS. 8 and 11 of the annexed drawings, a locking device, generally designated by the reference numeral 56, is provided for locking the universal joint parts 43 of the universal joints 41 to the end 14 of each drum 11. Each locking device 56 comprises a pair of opposed plates 57 and 58 which are secured to the end 14 on opposite sides of the plate or panel 51 of the joint part 43 by means of suitable screws 61; the plates being formed with aligned passages 62 for the reception of a bolt 63 having a turning lever 64 thereon so that the bolt 63 not only can be readily inserted into and withdrawn from the passages 62 but also can be rotated by grasping and turning the lever 64 of the bolt. Mounted on plate 58 of the pair of opposed plates 57 and 58 is a bracket 65 for rotatably mounting a holddown locking pin 66 which includes a handle 67 and which is urged by means of a torsion spring 69 to a position overlying the turning lever 64 on bolt 63 to hold the same down and against movement. Torsion spring 69 is anchored at its one end in bracket 65 and at its other end in a hole, not shown, in holddown pin 66. To release the bolt-lever 64 to permit movement of locking bolt 63, it is only necessary to grasp the handle 67 of holddown pin 66 and lift up the same against the influence or force of torsion spring 69. It is to be observed that when inserting the tie-bolts 63 through passages 62 of plates 57 and 58, the bolts pass through the holes 51' of each of the panels 51 of joint parts 43 of each universal joint 41 to lock the same through plates 57 and 58 of locking device 56 directly to end 14 of each drum 11. The locking device, of course, does not affect or interfere with the pivotal and rotary movement of the connected universal joint parts 42 and 43. When dismantling the articulated drums 11 for storage on a dock or the like, it is only necessary to lift the handles 67 of holddown pins 66 of the locking devices 56 and then withdraw the bolts 63 from the two plates 57 and 58.

In accordance with the present invention and as shown in the annexed drawings, a pressure relief valve, designated generally by the reference numeral 71, is installed on each of the drums 11 to allow for relief of air under pressure which may build up within the drums by reason of fire, should the pollutants being confined catch on fire. The relieve valves 71 each comprises a valve body 72, having a laterally extending flange 73 as a base which serves along with bolts 74 to securely fasten the valve body to the rounded top of each drum 11, and also comprises a valve 76 at the inner end of a valve stem 77 which is spring-loaded by means of a compression spring 78 encircling valve stem 77 and confined between the top of valve body 72 and the head 79 of valve 76 within the valve body. As indicated, the valve body 72 overlies an opening 81 formed in the top of each drum; such opening normally being closed by valve 76, see FIG. 9, under the influence of compression spring 78. When the built-up pressure within a drum 11 exceeds the compressive force of spring 78, valve 76 is lifted from opening 81 of each drum to permit escape of the air under pressure which is vented to the atmosphere through opening 82 of valve body 72 of the relief valve 71. The head 83 of valve stem 77 is enlarged so as to seat the exterior of the top of valve body 72 when the valve 76 is in its normally closed position.

In order to facilitate the movement and the placement of the plurality of articulated drums 11 at a site for confining a water surface pollutant, such as oil slick, I provide a series of brackets 83 on each of the drums 11 by means of suitable bolts 84, such brackets each having an arched central section 86 for securing drum-connecting metal cables 87 therethrough. The brackets 83 are arranged in alignment longitudinally of each drum 11 and preferably at diametrically opposite points of the drums so that the metal cables 87 can be stretched and retained along both sides thereof. When the drums are tossed about, each of the cables 87 is drawn taut, as indicated at 88 and in so doing prevent the lateral collision of the drums 11 with one another, see FIG. 1, but when the drums are in calm waters and not being tossed about, the cables become slack, as indicated at 88'. A suitable anchor 89 is secured to the outer end of a metal rope 91 which is fastened to one of the metal cables through a link 92, serving to retain the articulated drums 11 in a given placed area surrounding the polluted material on the surface of the water.

It is to be observed that upon dismantling of the articulated drums 11 by withdrawing of the bolts 63 of locking devices 56 for storing the drums on a dock or the like, the universal joints 41 remain intact as well as the cables 87 as integral parts of each drum. For convenience in lifting the drums 11 for stacking, and replacement in the waters, suitable handles 93 are secured to the drums by means of bolts 94 adjacent to opposite ends of the body portion 12 of each drum.

It is to be understood that the appended claims are intended to cover the articulated drums as an entity, and also to cover the separate components of the individual drums as stabilized by the stabilizing fin and keel units.

I claim:

1. Fireproof equipment for confining surface pollutants within a predetermined area of water; said equipment comprising an indeterminate number of individual watertight fireproof floatable cylindrical drums of which the opposite ends comprise concave surfaces; each of said drums having the capability of floating with one-third of the diameter thereof submerged and two-thirds of the diameter thereof rising above the surface of water to serve as a barrier against escape of surrounded pollution material, and universal joints between adjacently disposed drums of said indeterminate number of individual drums; said universal joints effectively maintaining the entire group of said drums in upright position despite undue water motion and each comprising two main parts, one of said two main parts being rotatably mounted on one end of each of said drums, and the other of said two main parts is movable within the concave surfaces of an adjacent end of an adjacently disposed drum.

2. Equipment as set forth in claim 1, and a first hinge plate projecting from the free extremity of said one main part of said universal joint, a second hinge plate projecting from an outer extremity of said other of said main parts of said universal joint, and a pintle pin removably connecting said first hinge plate and said second hinge plate together.

3. Fireproof equipment as set forth in claim 1, and a locking device for securing said other main part of said universal joint to an adjacent end of an adjacently disposed drum; said locking device comprising a pair of plates secured to said adjacent end on opposite sides of said second hinge plate of said other main part and having aligned passages therethrough, a bolt extending through said passages and through said hinge plate, a turn-lever on said bolt and a holddown pin seated on said turn-lever of said bolt to prevent movement thereof except by the application of an external force.

4. Fireproof equipment as set forth in claim 1, and a pair of cables lashed to opposite sides of each of said drums to check thrashing about movements of the drums and relieve stresses on said joints.

5. In fireproof equipment for confining surface pollution material within a predetermined area of water, a plurality of articulated watertight fireproof drums of which one-third of the diameter thereof is submerged in the water, and a stabilizing fin and keel unit removably attached to the under side of the submerged portion of each of said drums; said stabilizing fin and keel unit being symmetrical in contour and comprising ears of equal dimensions projecting laterally from opposite sides of said unit, and a straight keel merging with said ears through arcuate sections of said unit; said keel being coextensive in length with the length of each of said drums.

* * * * *